United States Patent
Kim et al.

(10) Patent No.: US 7,640,574 B1
(45) Date of Patent: Dec. 29, 2009

(54) METHOD AND SYSTEM FOR RESOURCE BASED AUTHENTICATION

(75) Inventors: Beomsuk Kim, San Jose, CA (US); Mrudul Pradeep Uchil, San Jose, CA (US); Aravindan Ranganathan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 793 days.

(21) Appl. No.: 10/858,763

(22) Filed: Jun. 2, 2004

(51) Int. Cl.
*G06F 7/04* (2006.01)
*H04L 9/00* (2006.01)

(52) U.S. Cl. .................. 726/1; 726/8; 726/9; 726/10

(58) Field of Classification Search .............. 726/1, 726/2, 4, 8, 10; 713/156, 164, 165, 168, 713/173, 193
See application file for complete search history.

(56) References Cited

U.S. PATENT DOCUMENTS

| | | |
|---|---|---|
| 6,460,141 B1 | 10/2002 | Olden |
| 6,609,198 B1 | 8/2003 | Wood et al. |
| 6,618,806 B1 * | 9/2003 | Brown et al. ................. 713/186 |
| 7,117,359 B2 * | 10/2006 | Wood et al. .................... 713/155 |
| 7,185,364 B2 * | 2/2007 | Knouse et al. .................. 726/8 |
| 2002/0144108 A1 | 10/2002 | Benantar |
| 2002/0144119 A1 | 10/2002 | Benantar |
| 2004/0002878 A1 | 1/2004 | Maria Hinton et al. |
| 2004/0054791 A1 * | 3/2004 | Chakraborty et al. ......... 709/229 |
| 2007/0136785 A1 * | 6/2007 | Warrier et al. .................. 726/2 |

OTHER PUBLICATIONS

Angarwal et al., "An Overview of Sun ONE Portal Server," http//:developers.sun.com/prodtech/portalserver/reference/techart/ps_overview.html, Oct. 7, 2003 (15 pages).
"Sun™ ONE Indentity Server Overview—A Technical White Paper," Sun Microsystems, Mar. 2003, (14 pages).
"Introduction iPlanet™ Directory Server Access Management Edition—Version 5.0," Sun Microsystems 816-3373-01, Dec. 2001, (12 pages).

* cited by examiner

*Primary Examiner*—Beemnet W Dada
(74) *Attorney, Agent, or Firm*—Robert C. Kowert; Meyertons, Hood, Kivlin, Kowert & Goetzel, P.C.

(57) ABSTRACT

A method and system for resource based authentication may include, in response to a client attempting to access a protected resource of a system, implementing resource based authentication. A policy agent may intercept the client access request and redirect it to an appropriate authentication gateway module based upon authentication polices. If the protected resource is not associated with any resource specific authentication technique, the policy agent may apply a default authentication technique. If, however, the protected resource is associated with a particular resource specific authentication technique, the policy agent may apply the resource specific authentication technique without applying the default authentication technique.

15 Claims, 6 Drawing Sheets

METHOD AND SYSTEM FOR RESOURCE BASED AUTHENTICATION

BACKGROUND OF THE INVENTION

1. Field of the Invention

This invention relates to client authentication in networked computer systems, and specifically to resource based authentication.

2. Description of the Related Art

Companies need to store and make available an ever-increasing amount of information. Providing different types of information to people in an efficient, yet secure manner poses a considerable challenge. Companies must determine, and enforce, who is allowed to view each piece of information. Generally, the functions a person performs with or within the company define what information that person is allowed to use. Some information is available to everyone. Employees may be given broad access to the information related to their jobs, while business partners are generally given more restricted access based upon agreements setup between companies.

A common solution is to grant access to information on a per-application basis. Administrators setup usernames and passwords to govern access to the information they control. Such usernames and passwords are frequently setup individually for each resource a person needs to access when they first need such access. This also means that the same person may have to maintain an increasing number of user names and passwords.

Another alternative is to use group or role-based authentication. This is where users are assigned various "roles" relating to the type of information and services they use. One benefit of role-based authentication is that once a user has been authenticated, a web server may use defined roles to determine which resources that user is granted access.

In such a system, resource access is generally linked to user roles. An authenticated user's roles are matched against those roles allowed to use a certain resource. For example, a company's web server may provide general product information, internal product information, and confidential employee data. Customers may be able to view the general product information, employees may use the internal product information, and perhaps the confidential employee data is only available to the human resources department. To support these requirements, the company could assign each user the role of customer, employee or HR employee. Then, after a user was authenticated by a username/password system, that user's role might be looked up and used to determine whether to grant or deny access to certain resources.

SUMMARY

Shared system resources may be protected via administrator configured access and authentication policies. These policies may allow individual resources to be protected by different authentication techniques as may also establish a default authentication technique. When a client, perhaps a user through a web browser, attempts to access a protected resource of a system implementing such resource based authentication, a policy agent may intercept the client access request and redirect it to an appropriate authentication gateway based upon the system's access, or authentication, polices. If, according to one embodiment, a resource is not associated with any specific authentication technique, the policy agent may apply a default authentication technique in order to authenticate the client. If, however, a requested resource is associated with a particular resource specific authentication technique, the policy agent may apply the resource specific authentication technique to determine whether to allow access to the requested resource without applying the default authentication technique.

For example, in one embodiment, a policy may be in place that requires a client to successfully authentication against a particular authentication policy, such as certificate-based authentication prior to being granted access to a particular protected resource. In such an embodiment, when a client attempts to access the protected resource, a policy agent may receive or "intercept" the access request and may consult the system's authentication policies to determine what, if any policies, are associated with the requested resource. If, as in this example, the resource is associated with a resource specific authentication technique, without applying the default authentication technique the policy agent may invoke the appropriate authentication module that in turn attempts to authenticate the client. Only if the client can be successfully authenticated by the resource specific authentication policy may the client be granted access to the resource.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
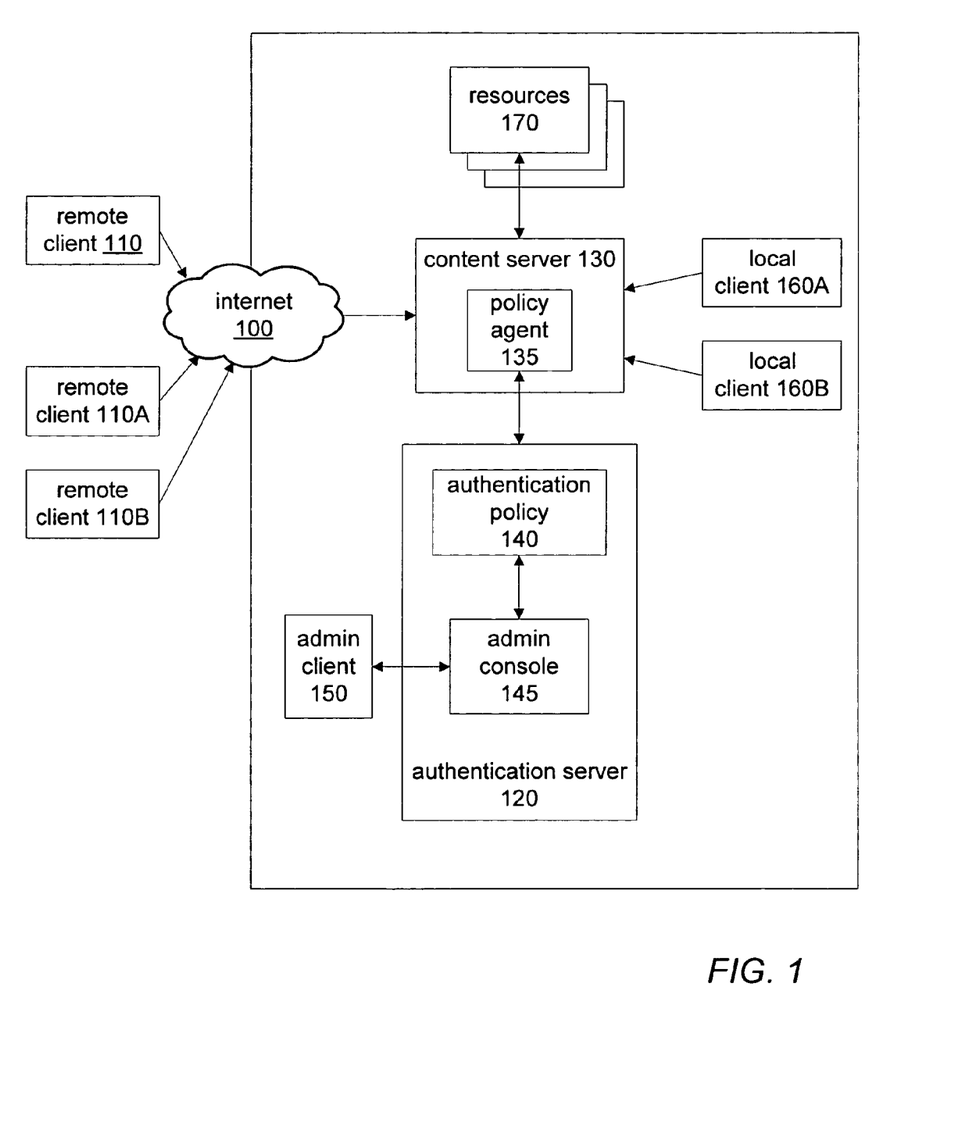
FIG. 1 is a block diagram illustrating, according to one embodiment, a network computer environment suitable for implementing resource based authentication as described herein.

FIG. 1 illustrates a computer network, according to certain embodiments, in which one or more devices may be configured to implement resource based authentication. In such an embodiment, at least one computing device on network 100 may be a client device, such as remote clients 110, 110A, 110B, or local clients 160A or 160B, with installed software that may be configured to communicate with other devices and request access to protected resources, such as resource 170 through content server 130. Additionally, in one embodiment, at least one computing device on network 100 may be configured to implement be an authentication server, such as authentication server 120 with installed software that may be configured to communicate with other processes or devices, store, maintain and consult authentication polices, such as authentication policy 140, and apply resource based authentication. Additionally, authentication server 120, may in one embodiment, be configured to provide an interface, such as admin console 145, for administrator clients, such as admin client 150, to generate and maintain, authentication policies, such as authentication policy 140.

When a client, such as client 110, attempts to access a protected resource of a system implementing resource based authentication, a policy agent, such as policy agent 135, may receive the access request and forward or redirect it to an appropriate authentication server based upon the system's access, or authentication, polices. If, according to one embodiment, a resource is not associated with any specific authentication technique, the policy agent may apply a default authentication technique in order to authenticate the client. If, however, a requested resource is associated in the systems access polices with a particular or specific authentication technique, the policy agent will apply that technique to determine whether to allow access to the requested resource without applying the default authentication technique, according to certain embodiments.

For example, in one embodiment, remote client 110 may attempt to access resource 170, and policy agent 135 may receive that request. Policy agent 135 may then forward that request to authentication server 120. In such an embodiment, authentication server 120 may consult authentication policy 140 to determine whether resource 170 is associated with a resource specific authentication technique, and if it is, authentication server 120 may then invoke the appropriate authentication module to authenticate client 110, and therefore may not invoke the system's default authentication module. If client 110 successfully authenticates against the appropriate authentication technique, access may be granted to resource 170. In exact manner in which client 110 may gain access to resource 170 after it is granted may vary from embodiment to embodiment. For example, in one embodiment, Sun's Identity Server™ may have implemented resource based authentication and may have successfully authenticated a client against a resource specific authentication technique. In such an example, Identity Server may then provide client 110 with a session token reflecting the fact that client 110 has been successfully authenticated that client 110 may present to gain access to resource 170. In other embodiments, no such session token may be used.

In one embodiment, authentication policy 140 may specify that a client pass a particular authentication technique, such as LDAP authentication, prior to being granted access to resource 170. In such an embodiment, when client 110 may attempt to access the resource 170, policy agent 135 may consult the authentication policy 140 to determine what, if any policies, apply to resource 170. If, as in this example, resource 170 is associated with a LDAP authentication, policy agent 135 may invoke the appropriate authentication module that in turn attempts to authenticate the client. Only if the client can be successfully authenticated will it be granted access to the resource.

Authentication techniques may vary from resource to resource or from the system's default authentication technique. By only performing one authentication technique, any type of authentication may be used as a resource based authentication policy. This may be true even when a resource's and the system's default authentication techniques conflict or have mutually exclusive requirements. An example of this could be using a default authentication technique requiring a non-ssl port, while assigning an authentication technique requiring the use of an ssl port to a particular resource. In this scenario, problems would arise when trying to apply the resource level authentication technique after applying the default authentication technique.

A client device, such as client 110, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable of communicating with processes or devices in a distributed computer environment. In different embodiments, a client device may execute software that may make access requests, such as a web browser, a Java application, a Java script, a Java applet, a C/C++ application, or HTML pages, etc. Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies.

A server device, such as content server 135 or authentication server 120, may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device with a digital heartbeat capable communicating with other processes or devices in a distributed computer environment. Access server 120 may be configured to couple over network 100 to one or more other devices via one or more wired or wireless network interfaces.

Figure 2:
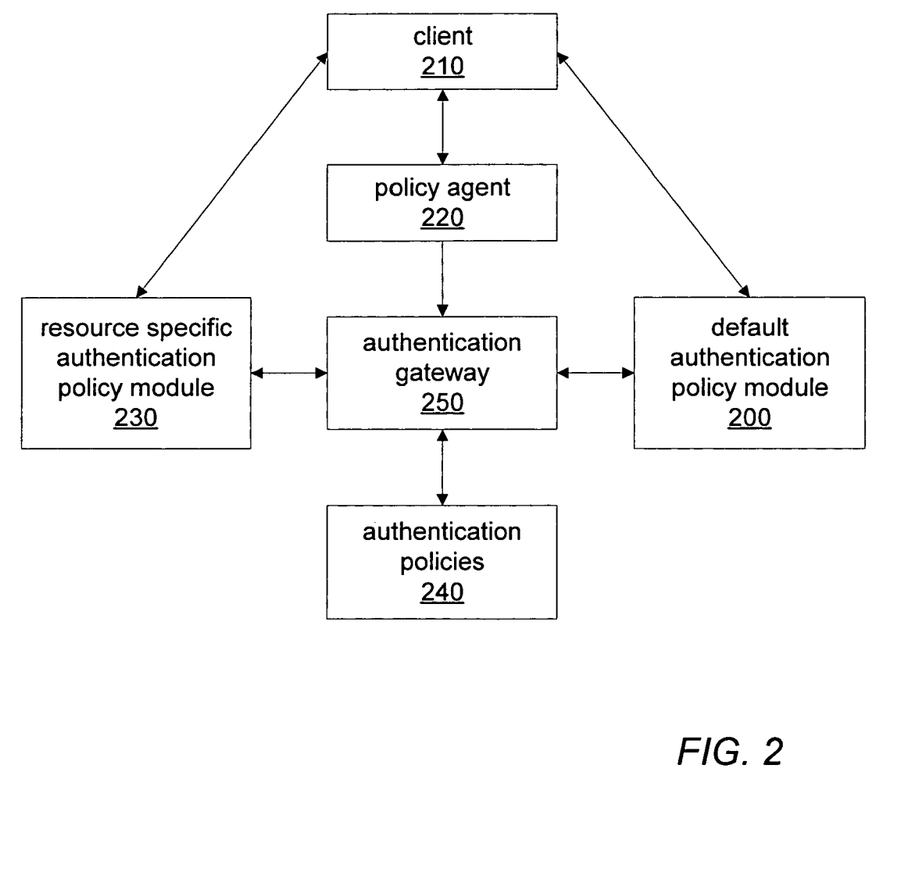
FIG. 2 is a block diagram illustrating one embodiment of a system applying resource based authentication.

Turning now to FIG. 2, which illustrates, according to one embodiment, an authentication gateway applying either a default or resource specific authentication policy module. In such an embodiment, a system may be configured to apply a default authentication to determine the identity of an accessing user or client and then determine which resources that client is allows to access based upon its established identity. Additionally, such a system may be configurable to also implement resource specific authentication where an accessing client must authenticate against a specific authentication technique in order to access a particular resource.

For example, in one embodiment, client 210 may attempt to access a protected resource, say resource 170, and policy agent 220 may receive client 210's access request and redirects it to authentication gateway 250. Authentication gateway 240 may, in one embodiment, consult authentication policies 240 to determine the appropriate authentication technique to apply. If the system is not configured to implement resource based authentication, authentication gateway 250 may, in one embodiment, invoke default authentication policy module 200. Alternatively, if the system is configured to implement resource based authentication, authentication gateway 250 may, in one embodiment invoke resource specific authentication module 230 to apply the appropriate authentication technique based upon authentication policies 240. In one embodiment, the system may be configured to implement resource based authentication, but resource 170 may not be associated with a particular authentication technique and therefore authentication gateway 250 may, in such an embodiment, invoke default authentication policy module 200 to authenticate client 210.

Figure 3:
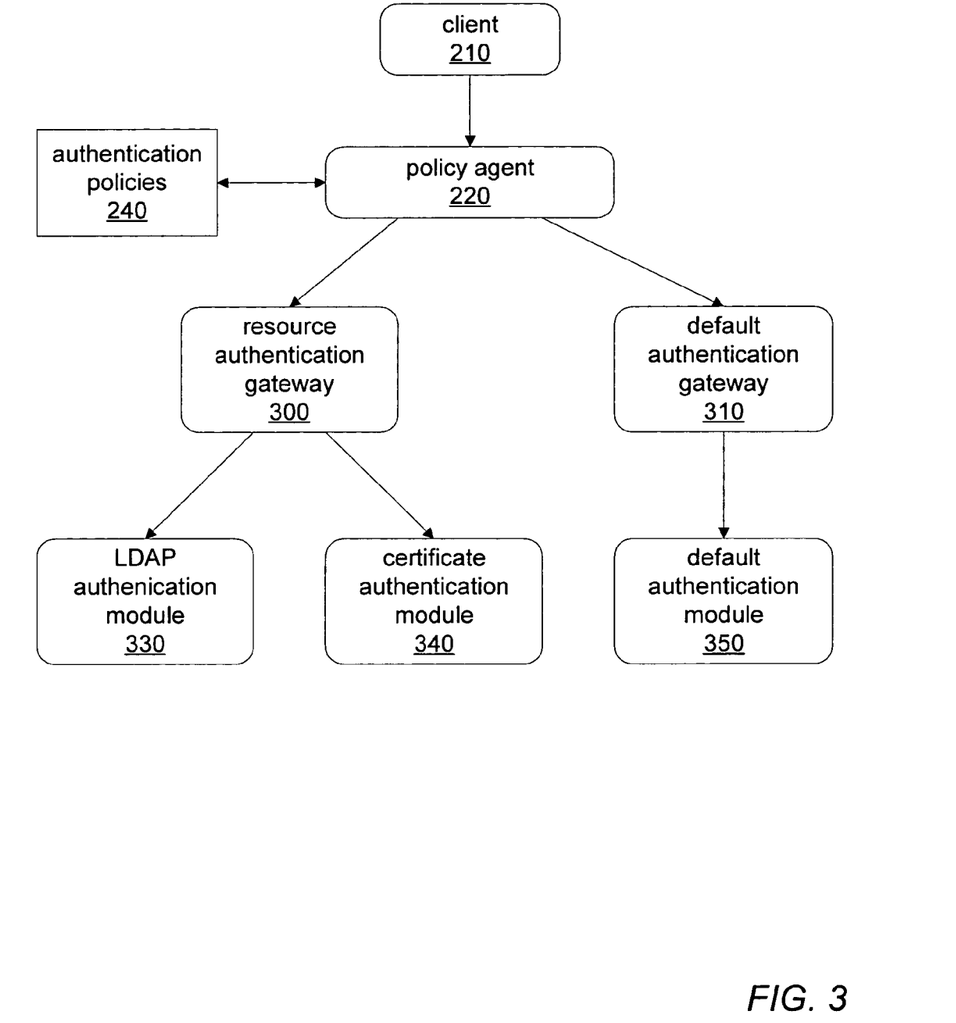
FIG. 3 is a block diagram illustrating the application of various authentication techniques according to one embodiment.

FIG. 3 illustrates, according to one embodiment, a policy agent invoke different gateways based upon the system's authentication polices. In one embodiment, policy agent 220 may be responsible for examining the client 210's current authentication status and either granting or diverting requests accordingly. If, for example, client 210 is not currently authenticated, policy agent 220 may redirect client 210's request to an authentication gateway to perform the actual authentication.

For example, in one embodiment, when client 210 attempts to access a protected resource, such as resource 170, policy agent 220 may consult authentication policies 240 to determine whether to apply the default authentication technique or a resource specific authentication technique. In such an embodiment, authentication policies 240 may indicate that the system is not configured for resource based authentication, or that resource 170 may not be associated with a specific authentication technique, and thus, policy agent 220 may redirect that client request to default authentication gateway 310 that in turn may invoke default authentication module 350. If however, authentication policies 240 indicate that resource 170 is associated with a particular authentication technique, policy agent 220 may redirect the client 210's request to resource authentication gateway 300. Authentication gateway 300 may invoke a specific authentication module, such as LDAP authentication module 330, or certificate authentication module 340. In one embodiment resource authentication module gateway 300 may consult authentication policies 240, or another set of system policies, to determine exactly what authentication module to invoke. In another embodiment however, policy agent 220, may inform resource authentication gateway 300 which authentication module to apply.

In another embodiment, if client 210 has already authenticated against the appropriate authentication technique, policy agent 220 may not redirect client 210's request to any authentication gateway, but may simply grant access to resource 170.

In certain embodiments, authentication modules may be separate processes running on devices distinct from the device on which policy agent 220 is running. In other embodiments however, policy agent 220, resource authentication gateway 330, default authentication gateway 310, and individual authentication modules 330, 340 and 350, may all be running on a single device. In yet other embodiments, a single process may perform the functions all of these modules.

Figure 4:
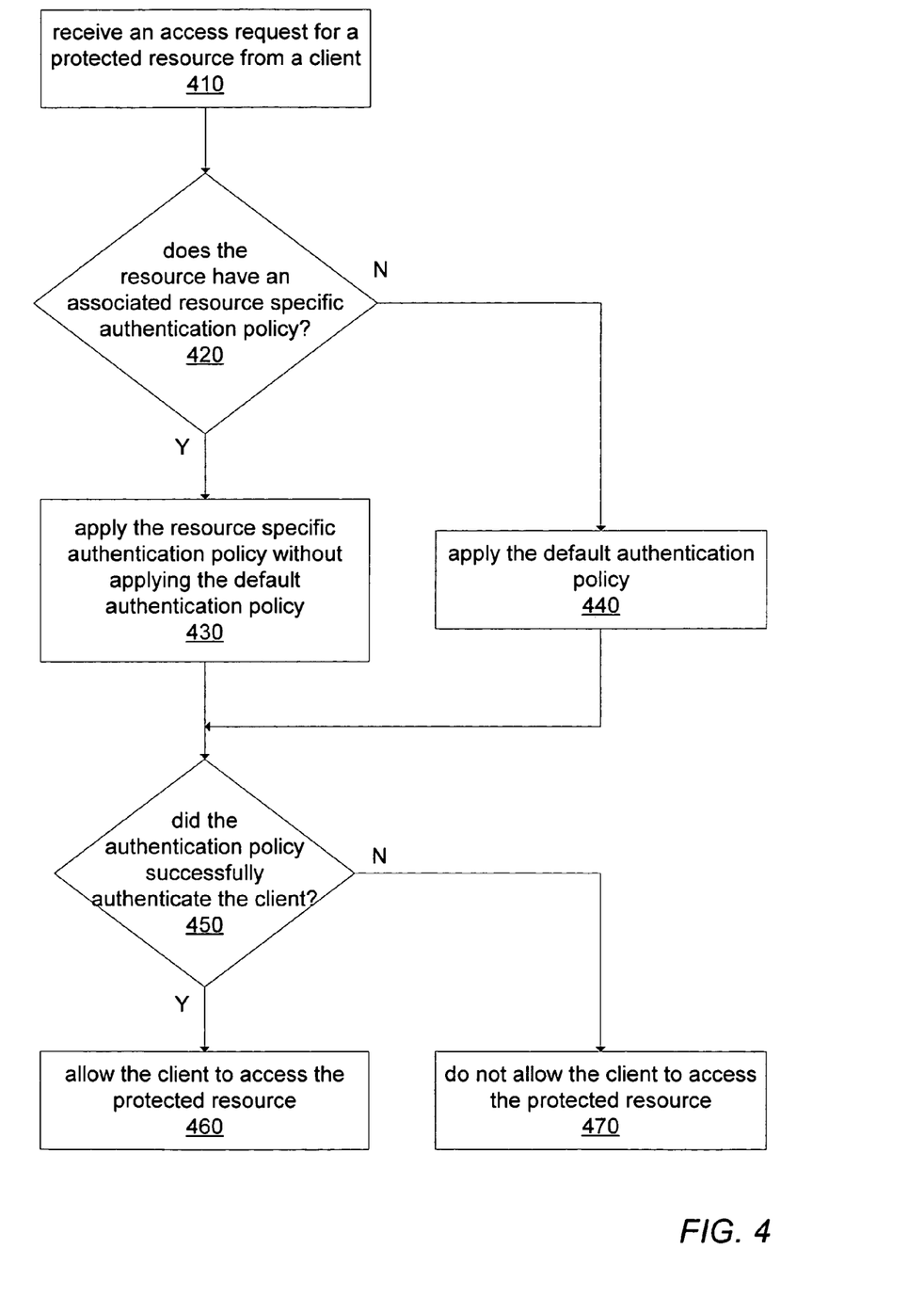
FIG. 4 is a flowchart illustrating one embodiment of a method for implementing resources based authentication.

FIG. 4 illustrates, according to one embodiment, a method for implementing resource based authentication as described herein. In such an embodiment, a web-based server may receive an access request for a protected resource from a client, as illustrated by block 410. For example policy agent 135 on content server 130 may receive an access request for resource 170 from client 110. In such an example, policy agent 135 may then determine whether resource 170 is associated with a resource specific authentication policy, as illustrated be decision block 420. If policy agent 135 determines that resource 170 is not associated with a particular authentication technique, policy agent 135 may apply a default authentication policy, as illustrated by block 440. In one embodiment, policy agent 135 may redirect the access request to an authentication gateway, such as default authentication gateway 310 to perform the actual authenticating, as described above.

However, in one embodiment, if policy agent 135 determines that resource 170 is associated with a particular resource specific authentication policy or technique, policy agent 135 may apply the specific authentication policy without applying the default authentication policy, as illustrated by block 430. For example, policy agent 135 may redirect the access request to resource authentication gateway 300, as described above.

Policy agent may then determine whether or not the applied authentication policy, either the default or the resource specific policy, was able to successfully authentication client 110, as illustrated by decision block 450. If client 110 was successfully authenticated by the authentication policy, policy agent 135 may then allow client 110 to access resource 170, as illustrated by block 460. However, the applied authentication policy was not able to successfully authenticate client 110 policy agent may not allow the client to access resource 170.

Figure 5:
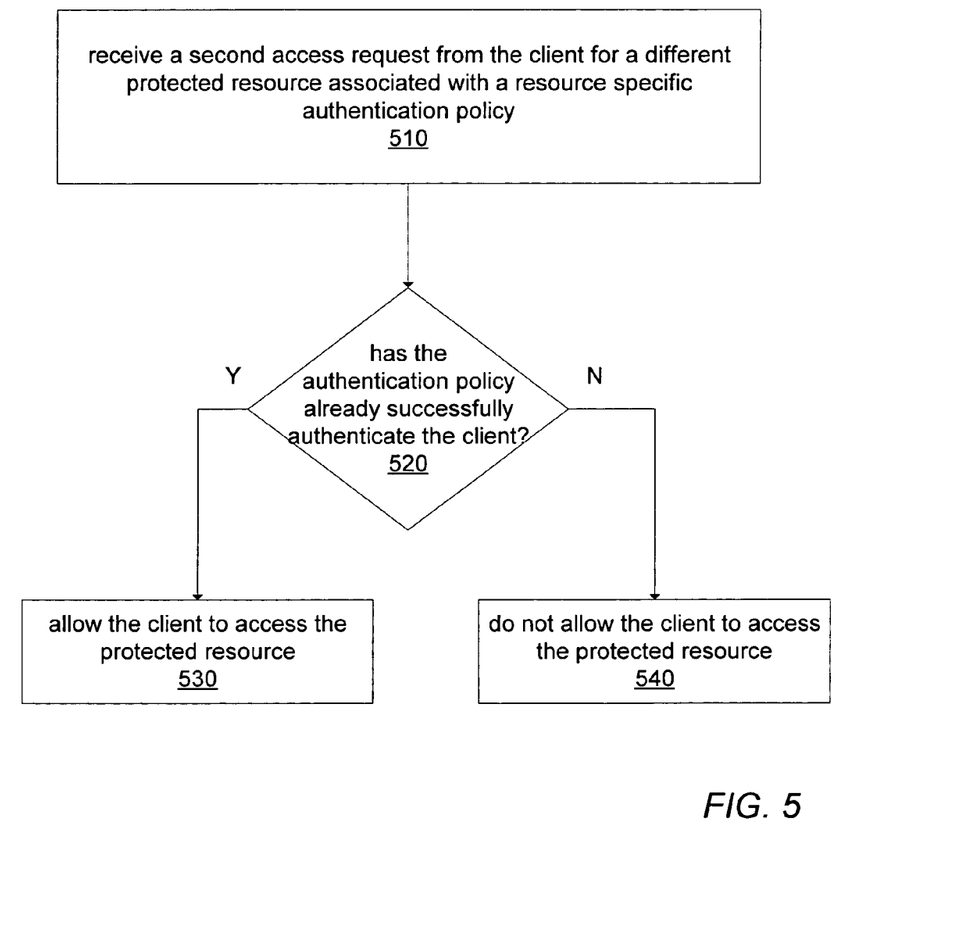
FIG. 5 illustrates one embodiment of a method for applied resource based authentication to subsequent access requests.

FIG. 5 illustrates one embodiment of a method for applied resource based authentication to subsequent access requests. For example, as described above, client 110 may have already requested and gained access to resource 170 by successfully authenticating against a resource specific authentication policy, such as LDAP authentication module 330. In one embodiment, client 110 may next request access to a different protected resource also associated with LDAP authentication module 330. In such an embodiment, policy agent 135 may, as illustrated by block 510, receive a second access request from client 110 for a different protected resource associated with a specific authentication policy. Policy agent may, as illustrated by block 520, determine whether client 110 has already successfully authentication against the specific authentication policy, in this example, LPAP authentication module 330. If client 110 was successfully authenticating by LPAP authentication module 330 previously, policy agent 135 may allow client 110 to access the resource indicated by second access request, as illustrated by block 530. If however, client 110 was not successfully authenticated by LPAP authentication module 330 previously, policy agent 135 may not allow client 110 to access the resource indicated by second access request, as illustrated by block 540. In a different embodiment, policy agent may, if client 110 was not successfully authentication previously, redirect client 110's second request to LDAP authentication module 330 to attempt to successfully authenticate client 110.

Figure 6:
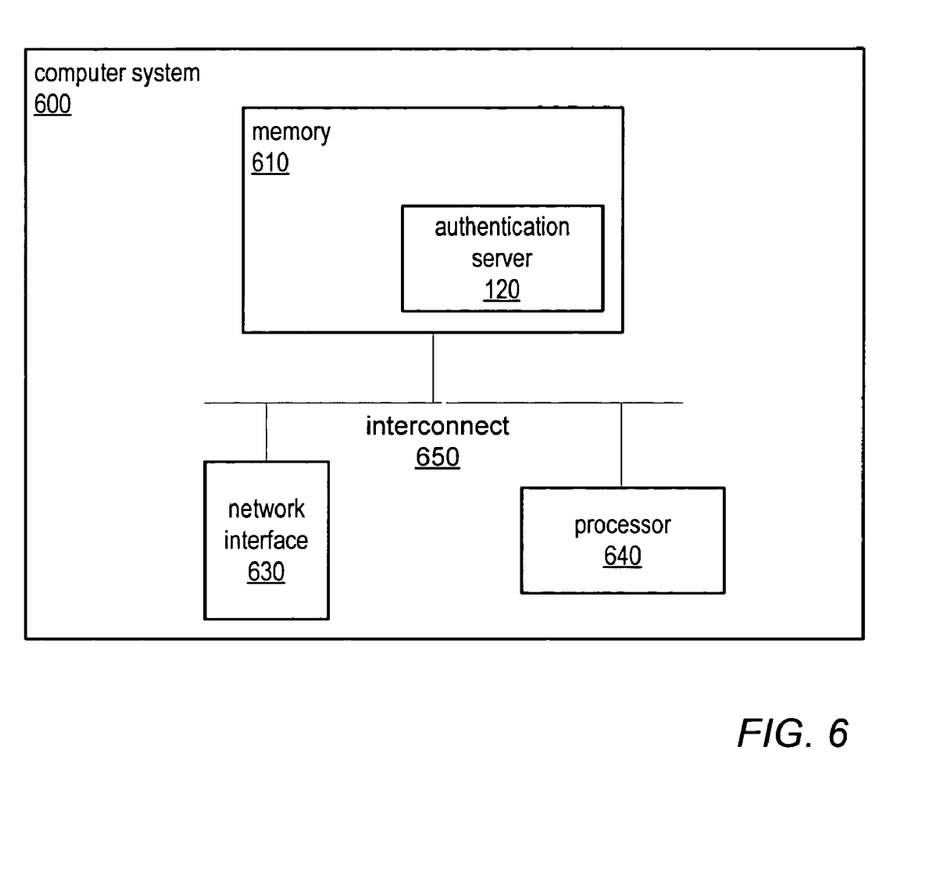
FIG. 6 is a block diagram illustrating a computer system suitable for implementing resource based authentication, according to one embodiment.

FIG. 6 illustrates a computing system capable of implementing secure, block-level capability tokens including revocable token identifiers as described herein and according to various embodiments. Computer system 600 may be any of various types of devices, including, but not limited to, a personal computer system, desktop computer, laptop or notebook computer, mainframe computer system, handheld computer, workstation, network computer, a consumer device, a smart appliance, or any type of networkable peripheral device such as storage devices, switches, modems, routers, etc, or in general any type of networkable computing device with a digital heartbeat. Computer system 600 may include at least one processor 640. Processor 640 may couple across interconnect 650 to memory 610 and network interface 630. Network interface 630 may be any of various types of interfaces configured to couple with and communicate over network 100 illustrated in FIG. 1 and described above.

Memory 610 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 610 may include program instructions configured to implement secure, block-level capability tokens including revocable token identifiers as described herein. In certain embodiments memory 610 may include program instructions configured to implement an authentication server, such as authentication server 120. In one embodiment, authentication server 120 may include program instructions configured to implement resource based authentication as described herein.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   intercepting, by a policy agent at a content server, an access request from a client to the content server for a protected resource of a system, wherein the client is not currently authenticated by the system, and wherein the system comprises a default authentication policy and is configurable to provide resource specific authentication policies;
   in response to said intercepting:
   determining, at the content server, whether or not the protected resource has an associated resource specific authentication policy;
   selecting an appropriate authentication gateway or authentication module, wherein said selecting is performed at the content server and is performed based on said determining;
   if the protected resource has an associated resource specific authentication policy, communicating with the selected authentication gateway or authentication module at an authentication server to apply the resource specific authentication policy without applying the default authentication policy; and
   if the protected resource does not have an associated resource specific authentication policy, communicating with the selected authentication gateway or authentication module at an authentication server to apply the default authentication policy;
   wherein the authentication gateway is configured to invoke either a default authentication module or a resource-specific authentication module and wherein each authentication module is configured to authenticate the client wherein at least one authentication module is an LDAP authentication module or a certificate authentication module;
   the content server providing the client access to the protected resource dependent on a result from the authentication server applying the resource specific authentication policy or the default authentication policy;
   wherein the content server and the authentication server applying the resource specific authentication policy or the default authentication policy are separate servers.

2. The method of claim 1, further comprising:
   in further response to said intercepting:
   if the protected resource has an associated resource specific authentication policy:
      allowing the client to access the protected resource if the resource specific authentication policy successfully authenticates the client; and
      not allowing the client to access the protected resource if the resource specific authentication policy does not successfully authenticates the client;
   if the protected resource does not have an associated resource specific authentication policy:
      allowing the client to access the protected resource if the default specific authentication policy successfully authenticates the client; and
      not allowing the client to access the protected resource if the default specific authentication policy does not successfully authenticates the client.

3. The method of claim 2, further comprising:
   the policy agent intercepting from the client another access request for a different protected resource of the system, wherein the different protected resource is associated with the resource specific authentication policy that successfully authenticated the user;
   allowing the client to access the second protected resource without applying the resource specific authentication policy a second time.

4. The method of claim 1, further comprising providing a user interface for a user to associate the resource specific authentication policy with the protected resource.

5. The method of claim 1, wherein the resource specific authentication policy comprises Certificate-based Authentication.

6. A device, comprising:
   a processor; and
   a memory storing program instructions executable by the processor to implement:
   a policy agent intercepting, at a content server, an access request from a client to the content server for a protected resource of a system, wherein the client is not currently authenticated by the system, and wherein the system comprises a default authentication policy and is configurable to provide resource specific authentication policies;
   in response to said intercepting:
   determining, at the content server, whether or not the protected resource has an associated resource specific authentication policy;
   selecting an appropriate authentication gateway or authentication module, wherein said selecting is performed at the content server and is performed based on said determining;
   if the protected resource has an associated resource specific authentication policy, communicating with the selected authentication gateway or authentication module at an authentication server to apply the resource specific authentication policy without applying the default authentication policy; and if the protected resource does not have an associated resource specific authentication policy, communicating with the selected authentication gateway or authentication module at an authentication server to apply the default authentication policy;

wherein the authentication gateway is configured to invoke either a default authentication module or a resource-specific authentication module and wherein each authentication module is configured to authenticate the client wherein at least one authentication module is an LDAP authentication module or a certificate authentication module;

instructing the content server to provide the client access to the protected resource dependent on a result from the authentication server applying the resource specific authentication policy or the default authentication policy;

wherein the content server and the authentication server applying the resource specific authentication policy or the default authentication policy are separate servers.

7. The device of claim 6, wherein the program instructions are further executable to:

in further response to said intercepting:

if the protected resource has an associated resource specific authentication policy:

allow the client to access the protected resource if the resource specific authentication policy successfully authenticates the client; and not allow the client to access the protected resource if the resource specific authentication policy does not successfully authenticates the client;

if the protected resource does not have an associated resource specific authentication policy:

allow the client to access the protected resource if the default specific authentication policy successfully authenticates the client; and not allow the client to access the protected resource if the default specific authentication policy does not successfully authenticates the client.

8. The device of claim 7, wherein the program instructions are further executable to implement:

the policy agent intercepting from the client another access request for a different protected resource of the system, wherein the different protected resource is associated with the resource specific authentication policy that successfully authenticated the user;

allow the client to access the second protected resource without applying the resource specific authentication policy a second time.

9. The device of claim 6, wherein the program instructions are further executable to provide a user interface allowing a user to associate the resource specific authentication policy with the protected resource.

10. The device of claim 6, wherein the resource specific authentication policy comprises Certificate-based Authentication.

11. A computer accessible storage medium, storing program instructions computer-executable to implement:

intercepting, by a policy agent at a content server, an access request from a client to the content server for a protected resource of a system, wherein the client is not currently authenticated by the system, and wherein the system comprises a default authentication policy and is configurable to provide resource specific authentication policies;

in response to said intercepting:

determining, at the content server, whether or not the protected resource has an associated resource specific authentication policy;

selecting an appropriate authentication gateway or authentication module, wherein said selecting is performed at the content server and is performed based on said determining;

if the protected resource has an associated resource specific authentication policy, communicating with the selected authentication gateway or authentication module at an authentication server to apply the resource specific authentication policy without applying the default authentication policy; and if the protected resource does not have an associated resource specific authentication policy, communicating with the selected authentication gateway or authentication module at an authentication server to apply the default authentication policy;

wherein the authentication gateway is configured to invoke either a default authentication module or a resource-specific authentication module, and wherein each authentication module is configured to authenticate the client, wherein at least one authentication module is an LDAP authentication module or a certificate authentication module;

instructing the content server to provide the client access to the protected resource dependent on a result from the authentication server applying the resource specific authentication policy or the default authentication policy;

wherein the content server and the authentication server applying the resource specific authentication policy or the default authentication policy are separate servers.

12. The computer accessible storage medium of claim 11, wherein the program instructions are further computer-executable to implement:

in further response to said intercepting:

if the protected resource has an associated resource specific authentication policy:

allowing the client to access the protected resource if the resource specific authentication policy successfully authenticates the client; and not allowing the client to access the protected resource if the resource specific authentication policy does not successfully authenticates the client;

if the protected resource does not have an associated resource specific authentication policy:

allowing the client to access the protected resource if the default specific authentication policy successfully authenticates the client; and not allowing the client to access the protected resource if the default specific authentication policy does not successfully authenticates the client.

13. The computer accessible storage medium of claim 12, wherein the program instructions are further computer-executable to implement:

the policy agent intercepting from the client another access request for a different protected resource of the system, wherein the different protected resource is associated with the resource specific authentication policy that successfully authenticated the user;

allowing the client to access the second protected resource without applying the resource specific authentication policy a second time.

14. The computer accessible storage medium of claim 11, wherein the program instructions are further computer-executable to implement a user interface allowing a user to associate the resource specific authentication policy with the protected resource.

15. The computer accessible storage medium of claim 11, wherein the resource specific authentication policy comprises Certificate-based Authentication.

* * * * *

UNITED STATES PATENT AND TRADEMARK OFFICE
CERTIFICATE OF CORRECTION

PATENT NO.      : 7,640,574 B1                                      Page 1 of 1
APPLICATION NO. : 10/858763
DATED           : December 29, 2009
INVENTOR(S)     : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1427 days.

Signed and Sealed this

Sixteenth Day of November, 2010

David J. Kappos
*Director of the United States Patent and Trademark Office*